(12) United States Patent
Prakash

(10) Patent No.: US 8,301,702 B2
(45) Date of Patent: Oct. 30, 2012

(54) METHOD AND AN APPARATUS TO SCREEN ELECTRONIC COMMUNICATIONS

(75) Inventor: Vipul V. Prakash, San Francisco, CA (US)

(73) Assignee: Cloudmark, Inc., San Francisco, CA (US)

( * ) Notice: Subject to any disclaimer, the term of this patent is extended or adjusted under 35 U.S.C. 154(b) by 2393 days.

(21) Appl. No.: 10/799,860

(22) Filed: Mar. 12, 2004

(65) Prior Publication Data

US 2005/0198289 A1 Sep. 8, 2005

Related U.S. Application Data

(60) Provisional application No. 60/537,921, filed on Jan. 20, 2004.

(51) Int. Cl.
*G06F 15/16* (2006.01)

(52) U.S. Cl. .......................... 709/206; 704/204

(58) Field of Classification Search .................. None
See application file for complete search history.

(56) References Cited

U.S. PATENT DOCUMENTS

| | | | |
|---|---|---|---|
| 5,742,769 A | 4/1998 | Lee et al. | |
| 5,905,863 A * | 5/1999 | Knowles et al. | 709/206 |
| 6,460,050 B1 * | 10/2002 | Pace et al. | 709/206 |
| 6,546,416 B1 * | 4/2003 | Kirsch | 709/206 |
| 6,615,242 B1 | 9/2003 | Riemers | |
| 6,654,787 B1 * | 11/2003 | Aronson et al. | 709/206 |
| 6,732,149 B1 * | 5/2004 | Kephart | 709/206 |
| 6,732,157 B1 * | 5/2004 | Gordon et al. | 709/206 |
| 6,993,534 B2 * | 1/2006 | Denesuk et al. | 709/206 |
| 7,222,157 B1 * | 5/2007 | Sutton et al. | 709/206 |
| 7,293,063 B1 * | 11/2007 | Sobel | 709/206 |
| 7,299,261 B1 * | 11/2007 | Oliver et al. | 709/206 |
| 7,373,664 B2 * | 5/2008 | Kissel | 726/22 |
| 7,711,779 B2 * | 5/2010 | Goodman et al. | 709/206 |
| 7,761,500 B1 | 7/2010 | Eckert et al. | |
| 7,831,667 B2 | 11/2010 | Gleeson et al. | |
| 2001/0037453 A1 * | 11/2001 | Mitty et al. | 713/168 |
| 2002/0199095 A1 | 12/2002 | Bandini et al. | |
| 2003/0074552 A1 * | 4/2003 | Olkin et al. | 713/150 |
| 2004/0073617 A1 * | 4/2004 | Milliken et al. | 709/206 |
| 2004/0093384 A1 * | 5/2004 | Shipp | 709/206 |
| 2005/0038754 A1 * | 2/2005 | Geist et al. | 713/175 |
| 2005/0091321 A1 * | 4/2005 | Daniell et al. | 709/206 |
| 2005/0198289 A1 | 9/2005 | Prakash | |
| 2006/0031298 A1 * | 2/2006 | Hasegawa | 709/206 |

(Continued)

FOREIGN PATENT DOCUMENTS

JP 2003188921 7/2003

(Continued)

OTHER PUBLICATIONS

Hindle, Richie. "An introduction to the Spambayes project." Linux Journal. Mar. 2003. vol. 2003, Issue 107, p. 2. Specialized Systems Consultants, Inc.*

(Continued)

*Primary Examiner* — Jeffrey R Swearingen
(74) *Attorney, Agent, or Firm* — Cooley LLP

(57) ABSTRACT

A method and an apparatus to screen electronic communications have been disclosed. In one embodiment, the method includes extracting URLs from electronic communication and analyzing the URLs extracted to determine whether the electronic communication is of a first predetermined category. Other embodiments have been claimed and described.

18 Claims, 2 Drawing Sheets

U.S. PATENT DOCUMENTS

2009/0132670 A1* 5/2009 Syiek et al. .................. 709/206
2012/0086971 A1* 4/2012 Bisbee et al. ................. 713/179

FOREIGN PATENT DOCUMENTS

| JP | 2004500761 | | 1/2004 |
|---|---|---|---|
| KR | 2005000015 A | * | 1/2005 |
| KR | 2005024765 A | * | 3/2005 |
| WO | WO 03/044617 A2 | | 5/2003 |
| WO | WO 2004/075029 A2 | | 9/2004 |
| WO | WO-2005074213 A1 | | 8/2005 |

OTHER PUBLICATIONS

Androutsopoulos, Ion et al. "An Experimental Comparison of Naïve Bayesian and Keyword-Based Anti-Spam Filtering with Personal E-mail Messages." SIGIR 2000. Jul. 2000. pp. 160-67. ACM Press.*

Cranor, Lorrie Faith et al. "Spam!" Communications of the ACM. Aug. 1998. vol. 41, No. 8, pp. 74-83. ACM Press.*

Patent Abstracts of Japan, vol. 2003, No. 12 (Dec. 12, 2003).

PCT Notification of Transmittal of the International Search Report and the Written Opinion of the International Searching Authority or the Declaration for PCT Counterpart Application No. PCT/US05/001754 Containing International Search Report (May 24, 2005).

PCT International Preliminary Report on Patentability, Mailed Oct. 22, 2007, 7 pages.

"Japanese Application Serial No. 2006-551249, Final Office Action mailed Mar. 22, 2011", 8 pgs.

"Japanese Application Serial No. 2006-551249, Office Action mailed May 18, 2010", 7 pgs.

"Japanese Application Serial 2006-551249, Office Action Response Filed Nov. 17, 2010", 21 pgs.

Amendment to corresponding JP Patent Application No. 2006-551249, Jul. 22, 2011, 10 pgs.

Amendment to corresponding EP Patent Application No. 05711689.9, Aug. 15, 2007, 11 pgs.

Office Action prepared for corresponding EP Patent Application No. 05711689.9, Jan. 16, 2012, 7 pgs.

Amendment to corresponding EP Patent Application No. 05711689.9, Apr. 19, 2012, 13 pgs.

T. Berners-Lee, "Uniform Resource Locators (URL)", Network Working Group, Request for Comments: 1738, Masinter & McCahill, Dec. 1994, 25 pages.

US 7,953,801, 05/2011, Prakash (withdrawn)

* cited by examiner

METHOD AND AN APPARATUS TO SCREEN ELECTRONIC COMMUNICATIONS

REFERENCE TO RELATED APPLICATION

This Application claims the benefit of U.S. Provisional Patent Application No. 60/537,921, filed on Jan. 20, 2004, and entitled, "Whiplash A New Signature Scheme for Spam-Net."

FIELD OF INVENTION

The present invention relates to electronic communication, and more particularly, to screening electronic communication.

BACKGROUND

As the use of electronic communications has become increasingly popular for both personal purposes and work related purposes, more marketers send spams, to advertise their products and/or services. As used herein, the term "spam" refers to electronic communication that is not requested and/or is non-consensual. Also known as "unsolicited commercial e-mail" (UCE), "unsolicited bulk e-mail" (UBE), "gray mail" and just plain "junk mail," spam is typically used to advertise products. The term "electronic communication" as used herein is to be interpreted broadly to include any type of electronic communication or message including voice mail communications, short message service (SMS) communications, multimedia messaging service (MMS) communications, facsimile communications, etc.

However, the mass distribution of spams causes many users not only nuisance, but costly problems as well. Spams clutter the inboxes of users, who has to manually go through the incoming electronic communications to separate the unsolicited communications from other legitimate communications. Furthermore, spams generate massive amount of useless traffic in the electronic communication networked system of many companies, which at best, may slow down the delivery of important communications; at worst, may crash the networked systems of the companies.

A current way to screen electronic communications is to analyze the content of incoming electronic communications. Existing software analyzes the message body of incoming electronic communications to generate a number of fingerprints or signatures. The message body of a spam typically contains a marketing message of the spam sender, who is also known as a spammer. However, the spammer may randomly make minor modification in the body of the spam such that the fingerprints generated may not recognize the modified spam. Therefore, another existing way to screen electronic communications for spams applies the similarity algorithm to catch electronic communications having content substantially similar to the content of a previously identified spam.

However, such content-based screening processes are not typically satisfactory because a spammer may randomize the contents of the spams to defeat these screening processes. For example, some spams are littered with random junk to avoid detection by the existing content-based screening processes.

SUMMARY

The present invention includes a method and an apparatus to screen electronic communications. In one embodiment, the method includes extracting Uniform Resource Locators (URLs) from electronic communication and analyzing the URLs extracted to determine whether the electronic communication is of a first predetermined category.

In a specific embodiment, the URL includes either a domain name (which is a part of or equivalent to a hostname), or an Internet Protocol (IP) address.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to screen electronic communications are described. In one embodiment, the method includes extracting URLs from electronic communication and analyzing the URLs extracted to determine whether the electronic communication is of a first predetermined category.

In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
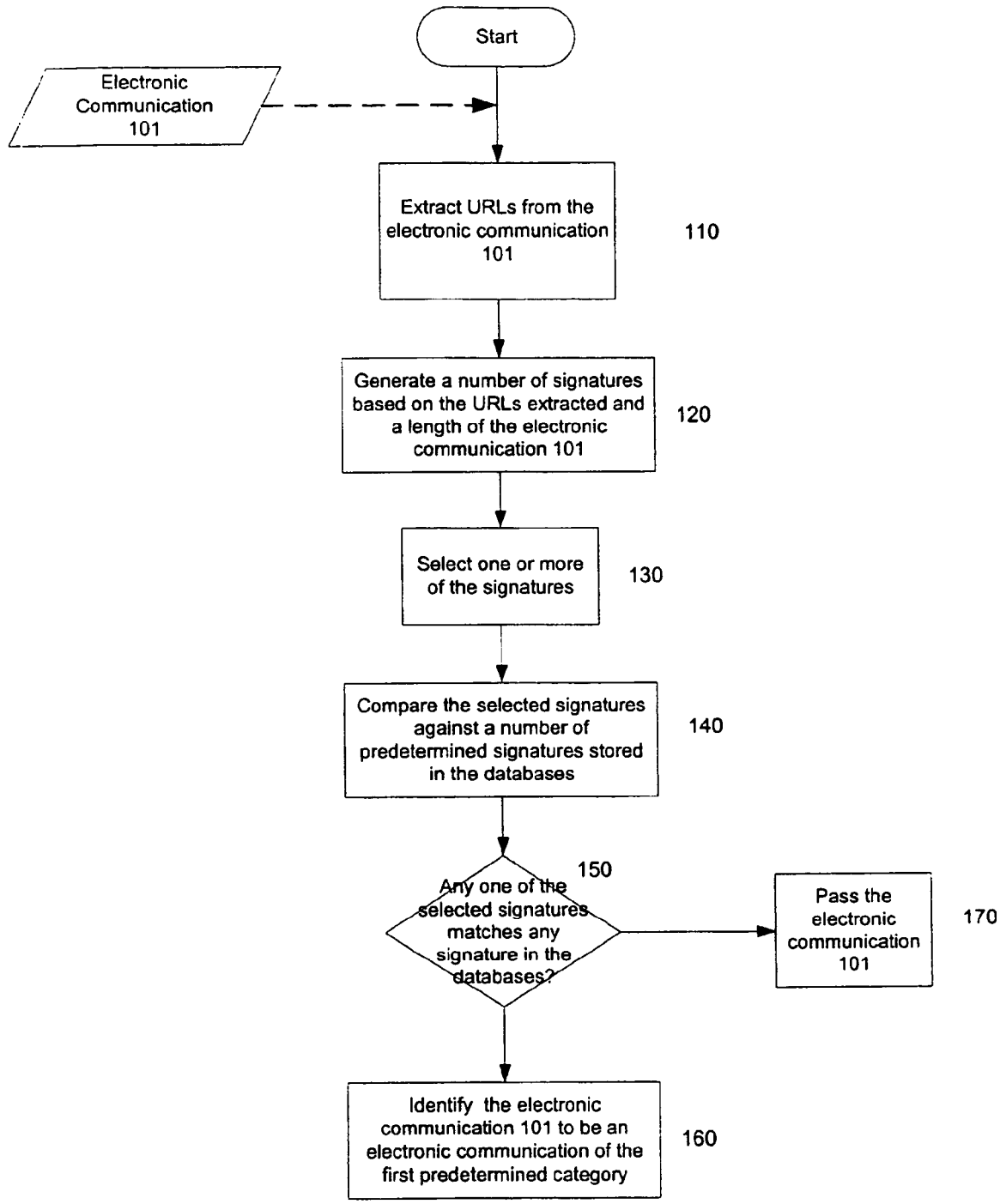
FIG. 1 illustrates a flow diagram of one embodiment of a process for screening electronic communications.

FIG. 1 shows a flow diagram of one embodiment of a process for screening electronic communications to identify electronic communications of a first predetermined category. The process is performed by processing logic that may comprise hardware (e.g., circuitry, dedicated logic, etc.), software (such as is run on a general-purpose computer system or a dedicated machine), or a combination of both.

Referring to FIG. 1, when the electronic communication 101 (e.g., an email) is received, processing logic extracts URLs from the electronic communication 101 (processing block 110).

In some embodiments, the first predetermined category of electronic communications includes spams. The spammers may use the web pages referenced by the URLs as landing web pages in the spams. The URL may include either a domain name (which is a part of or equivalent to a hostname) registered by spammers, a protocol, a subsection of a domain relative link, or an Internet Protocol (IP) address. For instance, processing logic may search for strings that begin in "http://", "https://", "ftp://", or "gopher://", and end in "@", ">", "<", or "/" characters. Additionally, processing logic may also extract strings containing "www." because strings containing "www." may be automatically converted into clickable URLs by some electronic communication software.

Furthermore, processing logic may reformat the URLs extracted or may retain such information in the original form. For example, hostnames may be reduced to lowercase and the leading and training white space is pruned. In one embodiment, if a hostname is an IP address, the IP address is retained in the original form. The hostname can be canonicalized and reduced to the domain name that is registered at a domain registrar. However, if the hostname is a top-level domain (TLD) name, then the parts before the second level name may be pruned. For example, "m6nb2.pillzthatwork.com" is reduced to "pillzthatwork.com," while "203.12.32.106" and "name.sf.ca.us" remains unmodified.

Referring back to FIG. 1, processing logic generates one or more derivatives of the hostname extracted (processing block 120). These derivatives may be referred to as signatures. For example, processing logic may generate one signature based on each URL extracted from the electronic communication. Furthermore, processing logic may generate a unique signature for each unique URL. Alternatively, processing logic may generate one signature based on multiple URLs extracted from the electronic communication. Furthermore, processing logic may generate one or more signatures based on the URLs extracted and the length of the electronic communication.

To generate signatures, processing logic may perform various computations or hashing on the URLs extracted. For example, in one embodiment, processing logic computes a SHA1 hash over the hostname extracted and uses the first 48 bits of the hash result as the first part of a signature. Processing logic may derive the next 16 bits of the signature from the length of the electronic communication. For example, the length may be computed using the following formulae:
length=orig_length—(orig_length % 100), where % is the remainder of integer division; length=length<100?100: length, if length is less than 100, then length should be set to 100, otherwise, the original value of length should be retained. In the above example, the resultant length would be a multiple of 100.

In one embodiment, the first 16 bits of SHA1(length) are concatenated to the 48 bits generated by the SHA1 of host to form a 64-bit signature of the electronic communication. The 64-bit signature may be referred to as a "Whiplash" in some embodiments.

However, one should appreciate that numerous computations may be performed to generate the signatures and variations of computation are within the scope of the present invention. The examples described above are merely for the purpose of illustration. Alternatively, processing logic may use the extracted URLs as the signatures.

Referring back to FIG. 1, processing logic selects one or more of the signatures generated (processing block 130). In one embodiment, the signatures are selected randomly. Processing logic compares the selected signatures against a set of predetermined signatures stored in a number of databases (processing block 140). The predetermined signatures stored may be generated from various known electronic communications of the first predetermined category reported by users via a collaborative submission mechanism. For example, the first predetermined category of electronic communication may include spams and the community of users reporting spams is SpamNet provided by Cloudmark, Inc. in San Francisco, Calif. Signatures are generated based on the URLs extracted from the reported electronic communications, such as domain names, hostnames, and IP addresses in the reported electronic communications.

In one embodiment, hostname canonicalization may be performed to extract the canonical domain from the hostname such that the extracted domain name is part of the host that was registered at a domain registrar. After performing hostname canonicalization, selection is performed on the hostnames and/or domain names extracted to evaluate whether a particular host or domain is suitable for acting as a source for a signature to filter electronic communication of the first predetermined category, such as spams. The fact that a domain is promoted may not imply that the electronic communication containing the domain name is a spam. The determination of whether the electronic communication is a spam is derived by the votes from the SpamNet community in one embodiment. Based on the reports from trusted users on the signatures computed on the promoted domains, a domain or host may be determined to be providing a landing page for spams. Such determination is also referred to as categorization. Some promoted domains may be deemed legitimate by the users reporting spams, and hence, these promoted domains are, nevertheless, not used for filtering spams.

In one embodiment, domain names that contains ".biz" and ".info" are promoted. Alternatively, signatures representing URLs that contains a predetermined string of characters or letters, such as "rx", "herb", "pharm", etc., may be promoted. Processing logic may also promote domain names containing certain IP addresses. Alternatively, processing logic may promote domain names that were registered within a certain period of time, such as the last six month. Furthermore, processing logic may demote domain names that contain dictionary words. Furthermore, a user may specify a particular domain name or hostname, in addition to the processing logic selected domain names, such that the user specified domain name or hostname is used in filtering the incoming electronic communications.

As discussed above, the predetermined signatures derived from the promoted domain names are stored in some databases. In one embodiment, the databases storing the predetermined signatures are referred to as catalog databases. Furthermore, the databases may be either local or remote. In one embodiment, two types of tables are stored in the catalog databases. The first type of tables (hereinafter, referred to as the signature tables) store general information of the predetermined signatures and the second type of tables (hereinafter, referred to as the meta tables) store meta information of the predetermined signatures. A signature table may store information on a number of predetermined signatures and a meta value for each predetermined signature that links the predetermined signature to an entry in a meta table.

The meta table may contain meta information about the host from which the signature was derived. The meta information may include the first 255 characters of the hostname that was the source of the corresponding signature, the WHOIS registration date of the domain part of the hostname, and a selection field. The entry in the selection field indicates whether the signatures derived from the host can be used for screening electronic communications. The meta information may further include the number of trusted reports and revocations for signatures based on the host, as well as the number of different signatures created on a particular host.

Based on the comparison of the selected signatures against the predetermined signatures in the databases, processing logic determines whether one of the selected signatures matches an entry in the databases (processing block 150). If there is a match, processing logic identifies the electronic communication as an electronic communication of the first predetermined category (processing block 160). In one embodiment, processing logic blocks the identified electronic communication. Alternatively, processing logic may tag the identified electronic communication or put the identified electronic communication into a predetermined location. If there is no match, processing logic may pass the electronic communication (processing block 170).

One advantage of screening electronic communications based on URLs is to make it harder for spammers to defeat the screening process. Since it is a lot more expensive to register a lot of domain names, hostnames, or IP addresses as landing web pages than to randomize the contents of electronic communications, the spammers are less likely to defeat the screening processes based on URLs.

Figure 2:
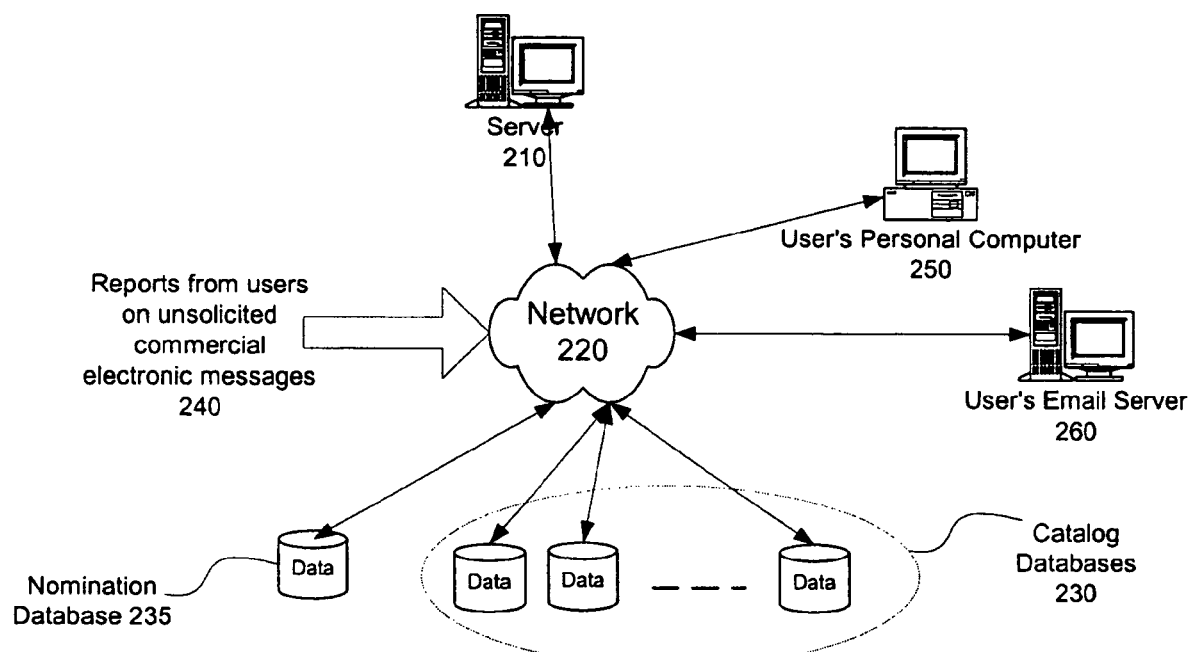
FIG. 2 illustrates one embodiment of a networked system.

FIG. 2 illustrates one embodiment of a networked system to screen electronic communications for electronic communications of a first predetermined category. The networked system 200 includes a server 210, a network 220, catalog databases 230, a nomination database 235, a user personal computer (PC) 250, and a user email server 260. The server 210, the catalog databases 230, the nomination database 235, the user personal computer (PC) 250, and the user email server 260 are coupled to each other via the network 220, which may include a local area network (LAN), a wide area network (WAN), or other types of networks.

Note that any or all of the components and the associated hardware illustrated in FIG. 2 may be used in various embodiments of the networked system 200. In one embodiment, the networked system 200 may be a distributed system. Some or all of the components in the networked system 200 (e.g., the catalog database 230) may be local or remote. However, it should be appreciated that other configuration of the networked system may include one or more additional devices not shown in FIG. 2.

Users of the networked system may have their PCs, such as the PC 250, coupled to the network 220 in order to access the catalog databases 230. Alternatively, enterprise users may have their electronic mail servers 260 or gateway servers coupled to the network 220 in order to access the databases 230.

Users may send reports 240 on electronic communications identified to be of the first predetermined category to the nomination database 235 via the network 220. For example, some of these reports 240 may be sent from the user PC 250 or the user email server 260. An example of such a community of users reporting spams is SpamNet provided by Cloudmark, Inc. in San Francisco, Calif. The server 210 generates signatures of the reported electronic communications based on the URLs extracted from the reported electronic communications, such as domain names, hostnames, and IP addresses. The signatures are stored in the catalog databases 230.

When a user receives electronic communication, the user PC 250 or the user email server 260 may extract URLs from the electronic communication to generate a number of signatures. One or more of the signatures generated may be selected and compared against the signatures stored in the catalog databases 230. If there is a matching signature, then the electronic communication is identified to be of the first predetermined category. In one embodiment, the electronic communication may be blocked automatically after being identified to be of the first predetermined category. Alternatively, the identified electronic communication may be tagged. In one embodiment, the identified electronic communication is removed from the inbox of the user and put into a predetermined location so that the blocked electronic communication is not lost. A user may review the blocked electronic communications and decide not to block a particular electronic communication, i.e., to unblock the electronic communication.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-accessible medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
using one or more computer processors, extracting Uniform Resource Locators (URLs) from electronic communication; and
analyzing the URLs extracted to determine whether the electronic communication is of a first predetermined category, said analyzing comprising generating one or more signatures using a length of the electronic communication and the URLs extracted, wherein analyzing includes determining whether the electronic communication is of a first predetermined category using the one or more signatures, wherein determining includes selecting one or more of the one or more signatures based on a plurality of predetermined criteria including selecting a signature if the signature represents a domain that was registered within a predetermined period of time.

2. The method of claim 1, wherein extracting the URLs comprises extracting at least one of a hostname, a domain name, a subsection of a domain relative link, and an Internet Protocol (IP) address from the electronic communication.

3. The method of claim 1, further comprising performing a predetermined operation on the electronic communication if the electronic communication is determined to be of the first predetermined category.

4. The method of claim 1, wherein analyzing the URLs comprises:
selecting one or more of the one or more signatures generated; and
comparing the selected signatures against a plurality of predetermined signatures generated from a plurality of known electronic communications of the first predetermined category, wherein each predetermined signature of the plurality of predetermined signatures has a signature based upon an electronic communication length and extracted URLs.

5. The method of claim 4, wherein generating the one or more signatures further comprises using at least one of the extracted URLs as at least one of the one or more signatures.

6. The method of claim 4, wherein generating the one or more signatures further comprises generating the one or more signatures based on at least one of a protocol, a hostname, a domain name, a subsection of a domain relative link, and an Internet Protocol (IP) address from the electronic communication.

7. The method of claim 4, further comprising classifying the electronic communication to be of the first predetermined category if one of the selected signatures matches one of the plurality of predetermined signatures.

8. The method of claim 4, wherein the plurality of predetermined signatures is derived from a plurality of electronic documents reported via a collaborative submission mechanism.

9. The method of claim 1, wherein generating the one or more signatures further comprises:
computing a first hash based on the length of the electronic communication;
computing a second hash based on the URLs extracted; and
generating a signature by concatenating the first hash to the second hash.

10. A non-transitory computer-readable storage medium that provides instructions that, if executed by a processor, will cause the processor to perform operations comprising:
generating one or more signatures of electronic communication using a length of the electronic communication and Uniform Resource Locators (URLs) in the electronic communication; and
determining whether the electronic communication is of a first predetermined category using the one or more signatures generated, wherein determining includes:
selecting one or more of the one or more signatures generated based on a plurality of predetermined criteria, wherein selecting one or more of the one or more signatures generated comprises selecting a signature if the signature represents a domain that was registered within a predetermined period of time;
comparing the selected signatures against a plurality of predetermined signatures; and
classifying the electronic communication to be of the first predetermined category if one of the selected signatures matches one of the plurality of predetermined signatures.

11. The non-transitory computer-readable storage medium of claim 10, wherein selecting one or more of the one or more signatures generated comprises selecting signatures representing one or more of a protocol, a hostname, a domain name, and a subsection of a domain relative link having a predetermined string of letters.

12. The non-transitory computer-readable storage medium of claim 10, wherein the operations further comprise extracting the URLs from the electronic communication.

13. A system comprising:
a plurality of databases to store a plurality of predetermined signatures of a plurality of known electronic communications of a first predetermined category; and
a server, coupled to the plurality of databases, including:
a memory device to store a plurality of instructions; and
a processor, coupled to the memory device, to retrieve the plurality of instructions from the memory device and to perform operations in response to the plurality of instructions, the operations comprising:
extracting Uniform Resource Locators (URLs) from electronic communication generating one or more signatures using a length of the electronic communication and the URLs extracted; and
comparing one or more of the one or more signatures generated against the plurality of predetermined signatures stored in the plurality of databases to determine whether the electronic communication is of the first predetermined category, wherein the first predetermined category indicates if a signature represents a domain that was registered within a predetermined period of time.

14. The system of claim 13, wherein the URLs comprise at least one of a hostname, a domain name, a subsection of a domain relative link, and an Internet Protocol (IP) address.

15. The system of claim 13, wherein the operations further comprise selecting the one or more of the plurality of signatures based on a plurality of predetermined criteria.

16. The system of claim 13, wherein the operations further comprise performing a predetermined operation on the electronic communication if the electronic communication is determined to be of the first predetermined category.

17. The system of claim 13, further comprising a database, coupled to the server, to store a plurality of reports from which the plurality of predetermined signatures are generated.

18. The system of claim 13, wherein the plurality of databases are in a remote location from the server.

* * * * *